(12) United States Patent
Lesartre et al.

(10) Patent No.: US 10,664,410 B2
(45) Date of Patent: May 26, 2020

(54) TRANSMITTING CONTENTS OF AN OPERATION FIELD TO A MEDIA CONTROLLER

(71) Applicant: HEWLETT PACKARD ENTERPRISE DEVELOPMENT LP, Houston, TX (US)

(72) Inventors: Gregg B Lesartre, Fort Collins, CO (US); Derek Alan Sherlock, Fort Collins, CO (US); Russ W Herrell, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 77 days.

(21) Appl. No.: 15/735,163

(22) PCT Filed: Jun. 18, 2015

(86) PCT No.: PCT/US2015/036438
§ 371 (c)(1),
(2) Date: Dec. 8, 2017

(87) PCT Pub. No.: WO2016/204766
PCT Pub. Date: Dec. 22, 2016

(65) Prior Publication Data
US 2018/0157600 A1 Jun. 7, 2018

(51) Int. Cl.
*G06F 12/00* (2006.01)
*G06F 12/1045* (2016.01)
*G06F 12/14* (2006.01)
*G06F 12/1027* (2016.01)
(Continued)

(52) U.S. Cl.
CPC ........ *G06F 12/1063* (2013.01); *G06F 9/5016* (2013.01); *G06F 12/1027* (2013.01);
(Continued)

(58) Field of Classification Search
CPC ............. G06F 12/1063; G06F 12/1027; G06F 9/5016; G06F 21/6218; G06F 12/1475;
(Continued)

(56) References Cited

U.S. PATENT DOCUMENTS 5,640,533 A 6/1997 Hays et al.
7,774,561 B2 8/2010 Mathews et al.
(Continued)

FOREIGN PATENT DOCUMENTS

EP 1182569 B1 3/2011

OTHER PUBLICATIONS

European Search Report and Search Opinion Received for EP Application No. 15895809.0, dated Oct. 11, 2018, 8 pages.
(Continued)

*Primary Examiner* — Mardochee Chery
(74) *Attorney, Agent, or Firm* — Hewlett Packard Enterprise Patent Department

(57) ABSTRACT

In example implementations, mapping fields and respective operation fields may be stored in a translation lookaside buffer (TLB) of a central processing unit (CPU) that is communicatively coupled to a storage volume. The operation fields may be populated based on processes, running on the CPU, corresponding to the respective mapping fields. In response to a storage volume access request generated by one of the processes, and based on contents of one of the mapping fields that matches the storage volume access request, a memory address corresponding to a memory location in the storage volume may be identified. A translated address based on the identified memory address, and contents of the respective operation field, may be transmitted to a media controller communicatively coupled to the CPU and the storage volume.

15 Claims, 5 Drawing Sheets

(51) Int. Cl.
*G06F 13/16* (2006.01)
*G06F 9/50* (2006.01)
*G06F 21/62* (2013.01)
*G06F 9/30* (2018.01)

(52) U.S. Cl.
CPC .......... *G06F 12/1475* (2013.01); *G06F 13/16* (2013.01); *G06F 21/6218* (2013.01); *G06F 9/3004* (2013.01)

(58) Field of Classification Search
CPC .... G06F 13/16; G06F 9/3004; G06F 12/1408; G06F 12/0246; G06F 12/145
USPC .......... 711/203, 204, 205, 206, 207
See application file for complete search history.

(56) References Cited

U.S. PATENT DOCUMENTS

| | | | |
|---|---|---|---|
| 7,793,074 | B1 | 9/2010 | Wentzlaff et al. |
| 8,364,973 | B2 | 1/2013 | Khosravi et al. |
| 9,536,110 | B2 * | 1/2017 | Goto ................. G06F 21/52 |
| 2001/0021969 | A1 | 9/2001 | Burger et al. |
| 2002/0144077 | A1 | 10/2002 | Andersson et al. |
| 2007/0016755 | A1 | 1/2007 | Pratt |
| 2007/0223704 | A1 | 9/2007 | Brickell et al. |
| 2013/0191649 | A1 | 7/2013 | Muff et al. |
| 2013/0339653 | A1 | 12/2013 | Bybell et al. |
| 2014/0047170 | A1 | 2/2014 | Cohen et al. |
| 2014/0297962 | A1 | 10/2014 | Rozas et al. |

OTHER PUBLICATIONS

International Search Report & Written Opinion received in PCT Application No. PCT/US2015/036438, dated Mar. 21, 2016, 15 pages.

Leontie, E. et al., No Principal Too Small: Memory Access Control for Fine-grained Protection Domains, (Research Paper), Jun. 1, 2012, 8 Pages.

* cited by examiner

US 10,664,410 B2

TRANSMITTING CONTENTS OF AN OPERATION FIELD TO A MEDIA CONTROLLER

BACKGROUND

Central processing units (CPUs) may read data from and write data to system memory. Page tables in system memory may be used to map virtual addresses used by the CPUs to physical addresses recognized by system memory. To facilitate translation of virtual addresses to physical addresses, a CPU may store, in a local translation lookaside buffer (TLB), a copy of some of the page table contents.

BRIEF DESCRIPTION OF THE DRAWINGS

The following detailed description references the drawings, wherein.

DETAILED DESCRIPTION

A central processing unit (CPU) may use a translation lookaside buffer (TLB) to store a local copy of page table contents of system memory. Certain pages in system memory may be accessible to certain processes running on the CPU and not accessible to other processes running on the CPU. A TLB may be populated to indicate various access permissions such that the CPU may determine whether a process running on the CPU is allowed to read data from and/or write data to a particular memory address. However, if additional functions are to be performed away from the CPU, an address read from the TLB may not provide enough information for a desired function to be executed. In light of the above, the present disclosure provides for storing additional data in a TLB, and transmitting such additional data to system memory, to facilitate validation and data protection beyond the CPU pipeline.

Figure 1:
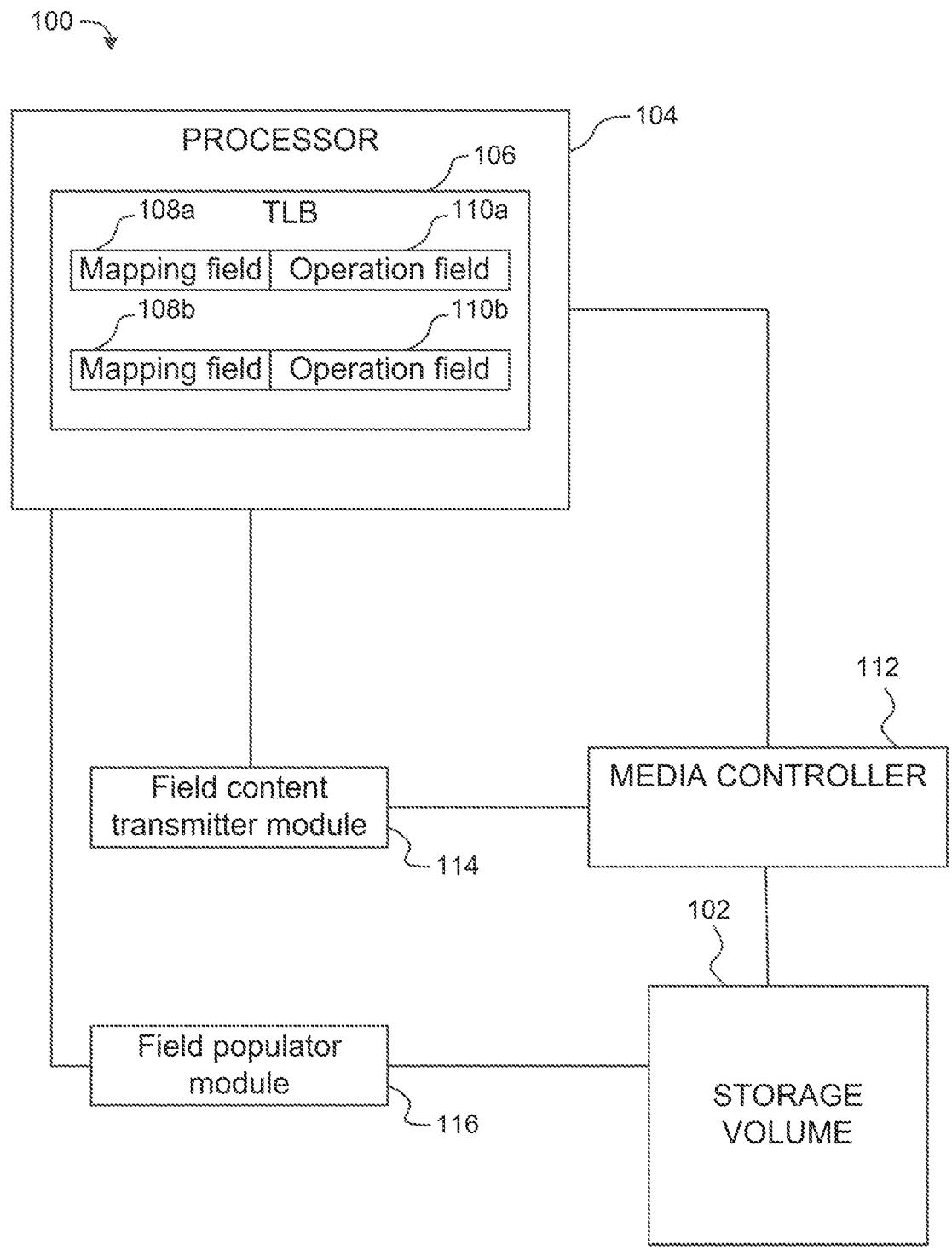
FIG. 1 is a block diagram of an example system for transmitting contents of an operation field to a media controller.

Referring now to the drawings, FIG. 1 is a block diagram of an example system 100 for transmitting contents of an operation field to a media controller. In some implementations, system 100 may operate as and/or be part of a server. In FIG. 1, system 100 includes media controller 112 communicatively coupled to storage volume 102 and processor 104. As used herein, the terms "include", "have", and "comprise" are interchangeable and should be understood to have the same meaning. As used herein, the term "storage volume" should be understood to refer to an area of storage capacity in a computer system. A storage volume (e.g., storage volume 102) may include physical storage devices (e.g., hard disk drive (HDD); solid-state drive (SSD); tape drive; non-volatile or hybrid dual in-line memory module (DIMM), which may include a dynamic random-access memory (DRAM) and/or non-volatile fast memory, such as memristor, resistive random-access memory (ReRAM), spin torque transfer random-access memory (STTRAM), phase-change memory (PCRAM)) and/or logical storage devices (e.g., a virtual disk). Components of system 100 may communicatively coupled via, for example, an input/output (I/O) architecture, Peripheral Component Interconnect Express (PCIe) bus, Serial Attached Small Computer System Interface (SAS) bus, storage area network (SAN), double data rate (DDR) bus, and/or other fabric.

Processor 104 may include TLB 106. In some implementations, processor 104 may be a CPU. TLB data may include copies of a subset of page tables stored in storage volume 102. In some implementations, TLB 106 may be stored in a volatile memory (e.g., DRAM) in processor 104. TLB 106 may include mapping fields 108a-b and respective operation fields 110a-110b. A mapping field may include a mapping of a memory address used by processor 104 to a memory address used to target a particular memory location in storage volume 102. For example, a mapping field may include a mapping of a virtual address used by processor 104 to a global address or physical address of storage volume 102. In some implementations, a mapping field may include a mapping of a virtual address used by processor 104 to an intermediate address that may be converted (e.g., by media controller 112) to another address recognized by storage volume 102 as referring to a particular memory location in storage volume 102. An address (e.g., global address, physical address or intermediate address) to which a virtual address is mapped in a mapping field may be referred to herein as a "translated address". Although one processor is shown in FIG. 1, it should be understood that system 100 may include additional processors (e.g., multiple CPUs may have access to storage volume 102), and that the concepts discussed herein may apply to systems with any number of processors.

Operation fields 110a-b may include non-address information that may be used for performing, away from processor 104, operations other than transferring data into or out of a memory location in storage volume 102. Each operation field in TLB 106 may correspond to a respective mapping field. In some implementations, multiple operation fields in TLB 106 may correspond to the same mapping field. Although two mapping fields and two operation fields are shown in FIG. 1, it should be understood that TLB 106 may include more than two mapping fields and respective operation fields, and that the concepts discussed herein may apply to TLBs with any number of mapping fields and respective operation fields. Contents of operation fields may vary for different processes and transactions based on, for example, transaction type (e.g., what type of operation is desired to be performed in storage volume 102), addresses targeted for access, system architecture, and media controller capabilities.

Media controller 112 may control access to and perform functions related to data in storage volume 102. As used herein, the term "media controller" should be understood to refer to a device that controls access to a storage volume. For example, a media controller may receive requests from hosts (e.g., processor 104 and other processors/CPUs) to read data from and write data to locations in a storage volume, and may schedule execution of such read and write operations. Although one media controller is shown in FIG. 1, it should be understood that system 100 may include additional media controllers, and that the concepts discussed herein may apply to systems with any number of media controllers. For example, different media controllers may control different segments of storage volume 102.

System 100 may include field populator module 116 and field content transmitter module 114. A module may include a set of instructions encoded on a machine-readable storage medium and executable by a processor. In addition or as an alternative, a module may include a hardware device comprising electronic circuitry for implementing the functionality described below. Where multiple logical modules are described, it may be possible to partially or fully incorporate the multiple logical modules into one physical module. Similarly, where a single logical module is described, it may be possible to distribute that single logical module between multiple physical modules.

Field populator module 116 may populate mapping fields 108a-b and respective operation fields 110a-b in TLB 106. Operation fields 110a-b may be populated based on processes, running on processor 104, corresponding to the respective mapping fields 108a-b. For example, mapping field 108a may correspond to a process, running on processor 104, that has access privileges to a particular segment of storage volume 102, and operation field 110a may include an authentication key so that the process may exercise its access privileges. Mapping field 108b may correspond to another process, running on processor 104, that does not have access privileges to the particular segment of storage volume 102, but may be allowed to call some memory-side acceleration functions, and operation field 110b may include an accelerator key to validate such functions. In some implementations, field populator module 116 may populate mapping and operation fields based on code that is specific to each unique use of the mapping and operation fields in a page table/TLB entry. In some examples, field populator module 116 may be partially or fully implemented by machine-readable instructions (e.g., software) running within a page manager infrastructure of processor 104. In some examples, field populator module 116 may populate page table entries.

Field content transmitter module 114 may, in response to a storage volume access request generated by a process (e.g., one of the processes running on processor 104), identify, based on contents of one of the mapping fields that matches the storage volume access request, a memory address corresponding to a memory location in storage volume 102. As used herein, the term "storage volume access request" should be understood to refer to a request to perform a function in and/or transfer data to/from a storage volume. For example, a storage volume access request may be a request to read data from a storage volume, or a request to write data to a storage volume. In some implementations, a process running on processor 104 may generate a request to write data to storage volume 102. The process may specify a virtual address as a destination for the data to be written. Field content transmitter module 114 may examine mapping fields (e.g., mapping fields 108a-b) in TLB 106 to find a mapping field that includes the virtual address specified by the process, and identify a physical address, in the mapping field, that maps to the virtual address. The physical address may correspond to a particular memory location in storage volume 102. In some implementations, the mapping field may map the virtual address to an intermediate address, as discussed above.

Field content transmitter module 114 may also transmit, to media controller 112 in response to the storage volume access request, a translated address based on the identified memory address, and contents of the respective operation field. For example, if mapping field 108a includes a virtual address specified by a storage volume access request and a physical address that maps to the virtual address, field content transmitter module 114 may transmit, to media controller 112, the physical address as well as the contents of operation field 108b. Transmitting contents of an operation field as well as a translated address to a media controller may allow operations other than transferring data into/out of a storage volume to be performed away from a CPU.

In some implementations, contents of an operation field (e.g., operation field 110a-b) may include an encryption key. In such implementations, media controller 112 may use the encryption key to decrypt data stored at the memory location of storage volume 102 targeted by the storage volume access request in response to which field content transmitter module 114 transmitted the encryption key. Media controller 112 may transmit the decrypted data to processor 104. The process that generated the storage volume access request may then use the decrypted data.

In some implementations, contents of an operation field (e.g., operation field 110a-b) may include an authentication key. In such implementations, media controller 112 may determine, based on the authentication key, access rights of the process that generated the storage volume access request in response to which field content transmitter module 114 transmitted the authentication key. Media controller 112 may prevent, in response to a determination that the process does not have access rights to the memory location targeted by the storage volume access request, access by the process to the memory location. For example, media controller 112 may ignore the storage volume access request, or may return an error to processor 104. If media controller 112 determines, based on the authentication key, that the process does have access rights to the targeted memory location, media controller 112 may allow the operation(s) specified by the storage volume access request to proceed (e.g., data may be written to/read from the targeted memory location in storage volume 102). The transmitting of an authentication key along with a translated address to media controller 112 may allow access to be regulated among different processes running on the same processor (e.g., processor 104).

In some implementations, contents of an operation field (e.g., operation field 110a-b) may include an accelerator key. In such implementations, media controller 112 may use the accelerator key to validate a memory-side acceleration function. If the transmitted accelerator key is not valid, access to the desired memory-side acceleration function may be disallowed, and/or bogus data may be generated (e.g., due to faulty decryption).

In some implementations, contents of an operation field (e.g., operation field 110a-b) may include a transaction identifier. A transaction identifier may be indicative of a process and/or an objective of the process. In such implementations, media controller 112 may identify, based on the transaction identifier, the process and determine whether the process has access rights to the memory location or function associated with the storage volume access request in response to which field content transmitter module 114 transmitted the transaction identifier. The transmitting of a transaction identifier along with a translated address to media controller 112 may allow different processes to have different permissions with respect to the same memory locations/functions in storage volume 102.

Figure 2:
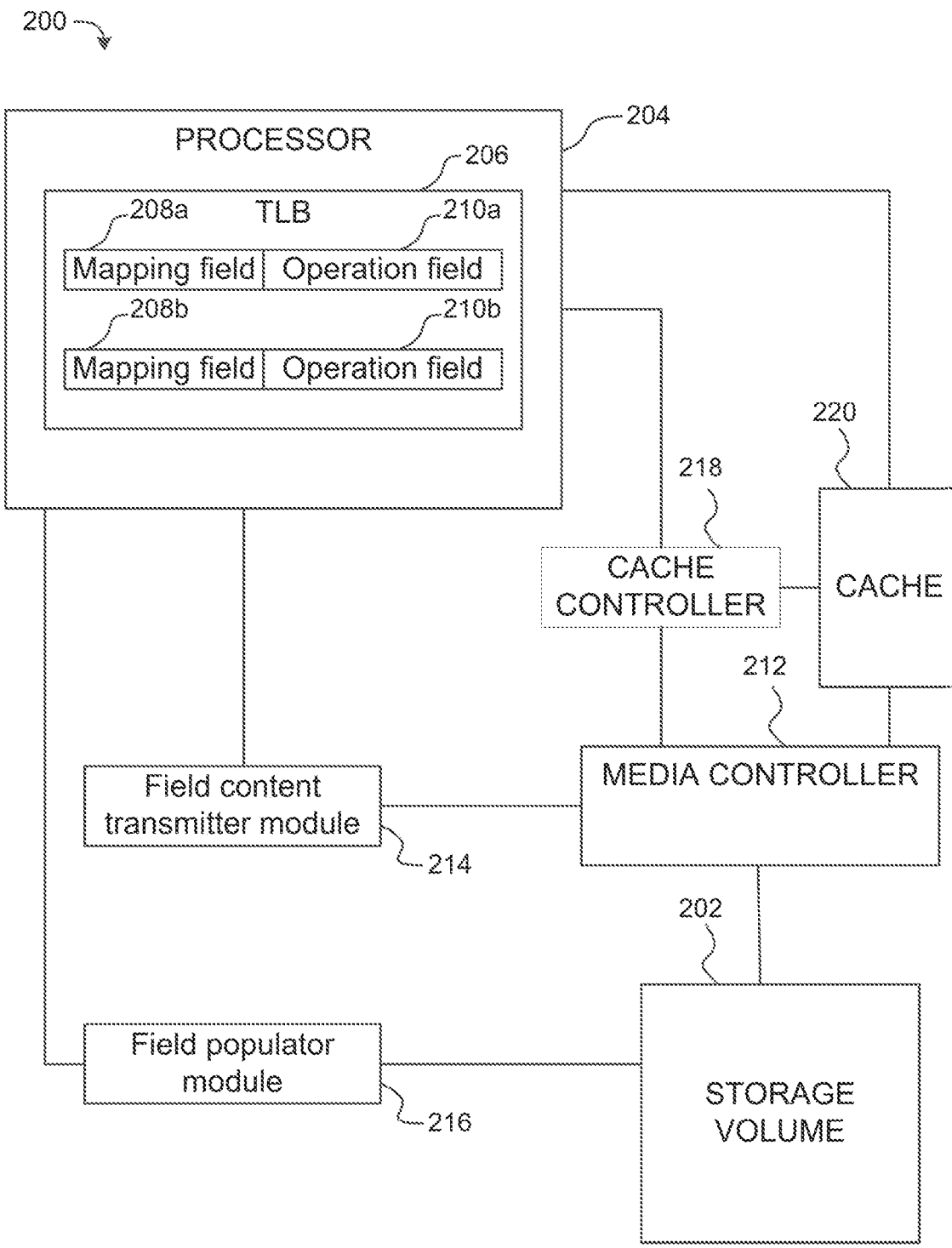
FIG. 2 is a block diagram of an example system having a cache and cache controller between a processor and media controller.

FIG. 2 is a block diagram of an example system 200 having a cache and cache controller between a processor and media controller. In some implementations, system 200 may operate as and/or be part of a server. In FIG. 2, system 200 includes storage volume 202, processor 204, media controller 212, field content transmitter module 214, field populator module 216, cache controller 218, and cache 220. Cache 220 may be communicatively coupled to cache controller 218, with cache 220 and cache controller 218 being communicatively coupled to processor 204 and media controller 212. Processor 204 and its contents (TLB 206 having mapping fields 208a-b and operation fields 210a-b) in FIG. 2 may be analogous to (e.g., have functions and/or components similar to) processor 104 and its contents (TLB 106 having mapping fields 108a-b and operation fields 110a-b) in FIG. 1. Storage volume 202, media controller 212, field content transmitter module 214, and field populator module 216 in FIG. 2 may be analogous to storage volume 102, media controller 112, field content transmitter module 114, and field populator module 116, respectively, in FIG. 1.

In some implementations, an operation field (e.g., one of operation fields 210a-b) in TLB 206 may include a cache permissions indicator. The cache permissions indicator may indicate a security level and/or access rights for associated data. In such implementations, media controller 212 may transmit the cache permissions indicator to cache controller 218. Cache controller 218 may determine, based on the cache permissions indicator, whether to store, in cache 220, a copy of data stored at the memory location of storage volume 202 targeted by the storage volume access request in response to which field content transmitter module 214 transmitted the cache permissions indicator to media controller 212. Cache controller 218 may not cache data that a process that generated the storage volume access request does not have permission to access, or may cache such data but only transfer it to a process that has the requisite access rights/permissions. In some implementations, cache controller 218 may not cache sensitive data and may instead pass the data directly to the process that requested the data.

Figure 3:
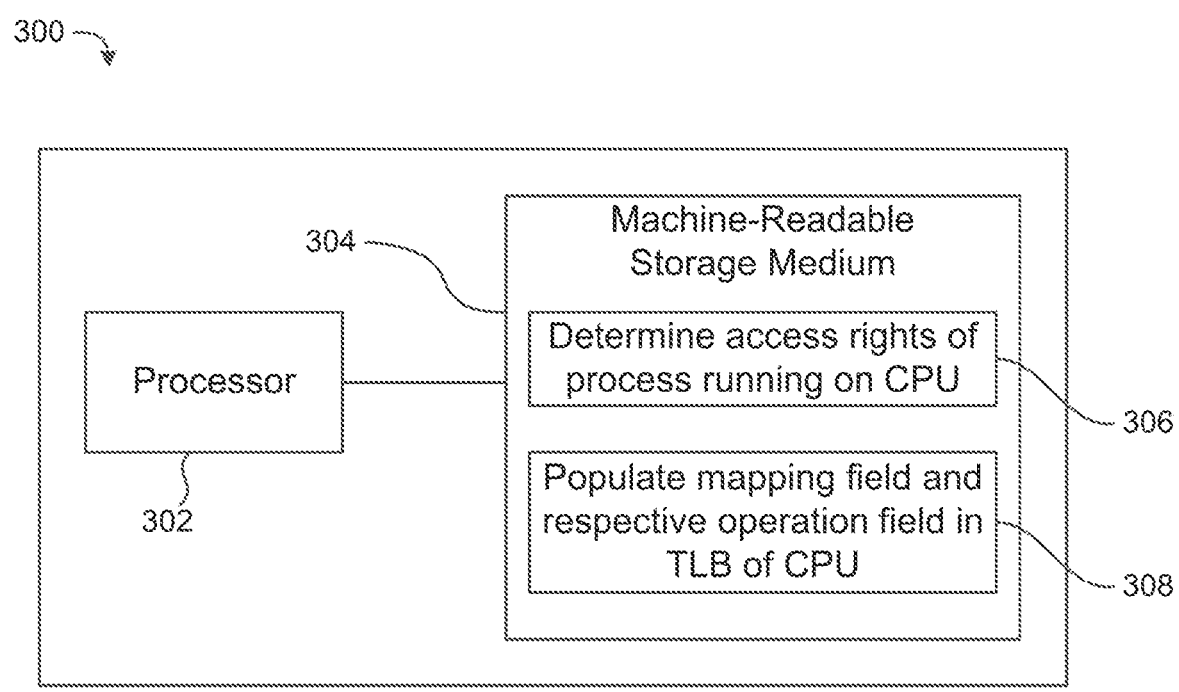
FIG. 3 is a block diagram of an example device that includes a non-transitory machine-readable storage medium encoded with instructions to populate a mapping field and a respective operation field in a translation lookaside buffer (TLB) of a central processing unit (CPU)

FIG. 3 is a block diagram of an example device 300 that includes a non-transitory machine-readable storage medium encoded with instructions to populate a mapping field and a respective operation field in a TLB of a central processing unit CPU. In some examples, device 300 may implement a field populator module (e.g., field populator module 116 of FIG. 1 or field populator module 216 of FIG. 2). In FIG. 3, device 300 includes processor 302 and machine-readable storage medium 304.

Processor 302 may include a CPU, microprocessor (e.g., semiconductor-based microprocessor), and/or other hardware device suitable for retrieval and/or execution of instructions stored in machine-readable storage medium 304. Processor 302 may fetch, decode, and/or execute instructions 306 and 308. As an alternative or in addition to retrieving and/or executing instructions, processor 302 may include an electronic circuit comprising a number of electronic components for performing the functionality of instructions 306 and/or 308.

Machine-readable storage medium 304 may be any suitable electronic, magnetic, optical, or other physical storage device that contains or stores executable instructions. Thus, machine-readable storage medium 304 may include, for example, a RAM, an Electrically Erasable Programmable Read-Only Memory (EEPROM), a storage device, an optical disc, and the like. In some implementations, machine-readable storage medium 304 may include a non-transitory storage medium, where the term "non-transitory" does not encompass transitory propagating signals. As described in detail below, machine-readable storage medium 304 may be encoded with a set of executable instructions 306 and 308.

Instructions 306 may determine access rights, for accessing a storage volume and functions related to data in the storage volume, of a process running on a CPU. For example, some processes may have read privileges and write privileges for a particular segment of a storage volume (e.g., storage volume 102 or 202), while other processes may have read privileges but not write privileges for the segment. Certain processes may have rights to access memory-side acceleration functionality on a media controller (e.g., media controller 112 or 212), while other processes do not have such rights. Additionally, some processes may have access only to perform certain operations on a data block with a memory-side accelerator, while the process that owns the data might have full access to read, write, or access the data through the memory-side accelerator. Access rights may be determined based on, for example, how important a process is to system operation, confidentiality of data used by the process, and/or whether the process owns the data, is permitted only specific interactions with the data, or is entirely blocked from access.

Instructions 308 may populate a mapping field and a respective operation field in a TLB of the CPU. For example, instructions 308 may populate any of mapping fields 108a-b and operation fields 110a-b in FIG. 1, and/or mapping fields 208a-b and operation fields 210a-b in FIG. 2. The respective operation field may be populated based on the determined access rights of the process. For example, an operation field corresponding to a process that accesses an encrypted segment of a storage volume may be populated with an encryption and/or authentication key. In some implementations, instructions 308 may populate mapping and operation fields based on code that is specific to each unique use of the mapping and operation fields in a page table/TLB entry.

Contents of the respective operation field may be transmitted, in response to a storage volume access request generated by the process and directed at a memory location that is in the storage volume and that corresponds to contents of the mapping field, to a media controller associated with the storage volume. In some implementations, the respective operation field may include an encryption key, an accelerator key, an authentication key, a transaction identifier, a cache permissions indicator, or any combination thereof. A media controller (e.g., media controller 112 or 212) that receives contents of an operation field may perform various operations depending on what is received, as discussed above with respect to FIGS. 1 and 2.

Figure 4:
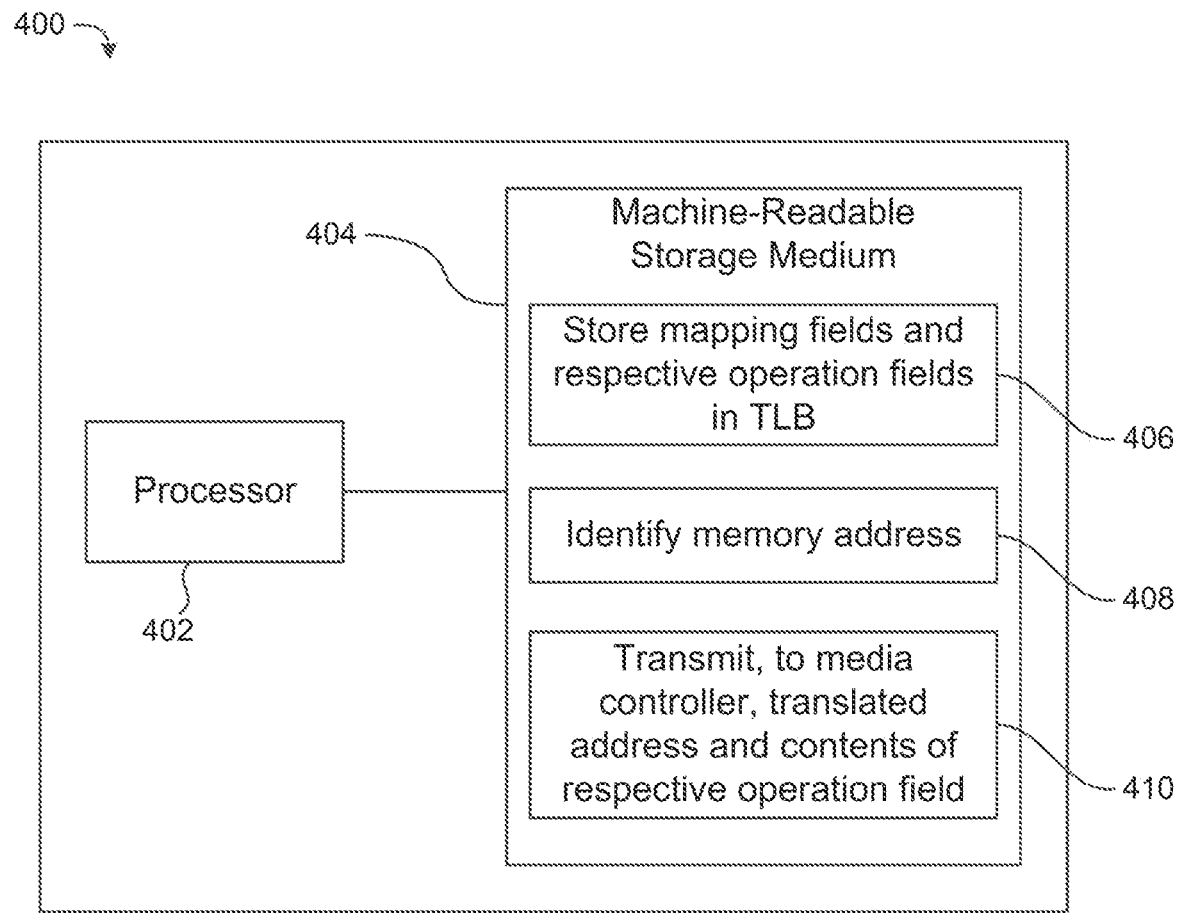
FIG. 4 is a block diagram of an example device that includes a non-transitory machine-readable storage medium encoded with instructions to enable transmitting contents of an operation field to a media controller.

FIG. 4 is a block diagram of an example device 400 that includes a non-transitory machine-readable storage medium encoded with instructions to enable transmitting contents of an operation field to a media controller. In some examples, device 400 may implement a field content transmitter module (e.g., field content transmitter module 114 of FIG. 1 or field content transmitter module 214 of FIG. 2). In FIG. 4, device 400 includes processor 402 and machine-readable storage medium 404.

Processor 402 may include a CPU, microprocessor (e.g., semiconductor-based microprocessor), and/or other hardware device suitable for retrieval and/or execution of instructions stored in machine-readable storage medium 404. Processor 402 may fetch, decode, and/or execute instructions 406, 408, and 410 to enable transmitting contents of an operation field to a media controller, as described below. As an alternative or in addition to retrieving and/or executing instructions, processor 402 may include an electronic circuit comprising a number of electronic components for performing the functionality of instructions 406, 408, and/or 410.

Machine-readable storage medium 404 may be any suitable electronic, magnetic, optical, or other physical storage device that contains or stores executable instructions. Thus, machine-readable storage medium 404 may include, for example, a RAM, an EEPROM, a storage device, an optical disc, and the like. In some implementations, machine-readable storage medium 404 may include a non-transitory storage medium, where the term "non-transitory" does not encompass transitory propagating signals. As described in detail below, machine-readable storage medium 304 may be encoded with a set of executable instructions 406, 408, and 410.

Instructions 406 may store, in a TLB, of a CPU that is communicatively coupled to a storage volume, mapping fields and respective operation fields. For example, instructions 406 may store mapping fields 108a-b and operation fields 110a-b in TLB 106 of processor 104 in FIG. 1, or mapping fields 208a-b and operation fields 210a-b in TLB 206 of processor 204 in FIG. 2. Operation fields may be populated based on processes, running on the CPU, corresponding to the respective mapping fields, as discussed above with respect to FIGS. 1 and 3.

Instructions 408 may identify, in response to a storage volume access request generated by one of the processes, and based on contents of one of the mapping fields that matches the storage volume access request, a memory address corresponding to a memory location in the storage volume. For example, a storage volume access request may be a request to read data from a storage volume, or a request to write data to a storage volume. In some implementations, a process may generate a request to write data to a storage volume (e.g., storage volume 102 or 202). The process may specify a virtual address as a destination for the data to be written. Instructions 408 may examine mapping fields (e.g., mapping fields 108a-b or 208a-b) in a TLB (e.g., TLB 106 or 206) to find a mapping field that includes the virtual address specified by the process, and identify a physical address, in the mapping field, that maps to the virtual address. The physical address may correspond to a particular memory location in the storage volume. In some implementations, the mapping field may map the virtual address to an intermediate address, as discussed above with respect to FIG. 1.

Instructions 410 may transmit, to a media controller communicatively coupled to the CPU and the storage volume, a translated address based on the identified memory address, and contents of the respective operation field. For example, if the mapping field identified by instructions 408 includes a virtual address specified by a storage volume access request and a physical address to which the virtual address maps, instructions 410 may transmit, to a media controller (e.g., media controller 112 or 212), the physical address as well as the contents of the respective operation field. In some implementations, the respective operation field may include an encryption key, an accelerator key, an authentication key, a transaction identifier, a cache permissions indicator, or any combination thereof. A media controller (e.g., media controller 112 or 212) that receives contents of an operation field may perform various operations depending on what is received, as discussed above with respect to FIGS. 1 and 2.

Figure 5:
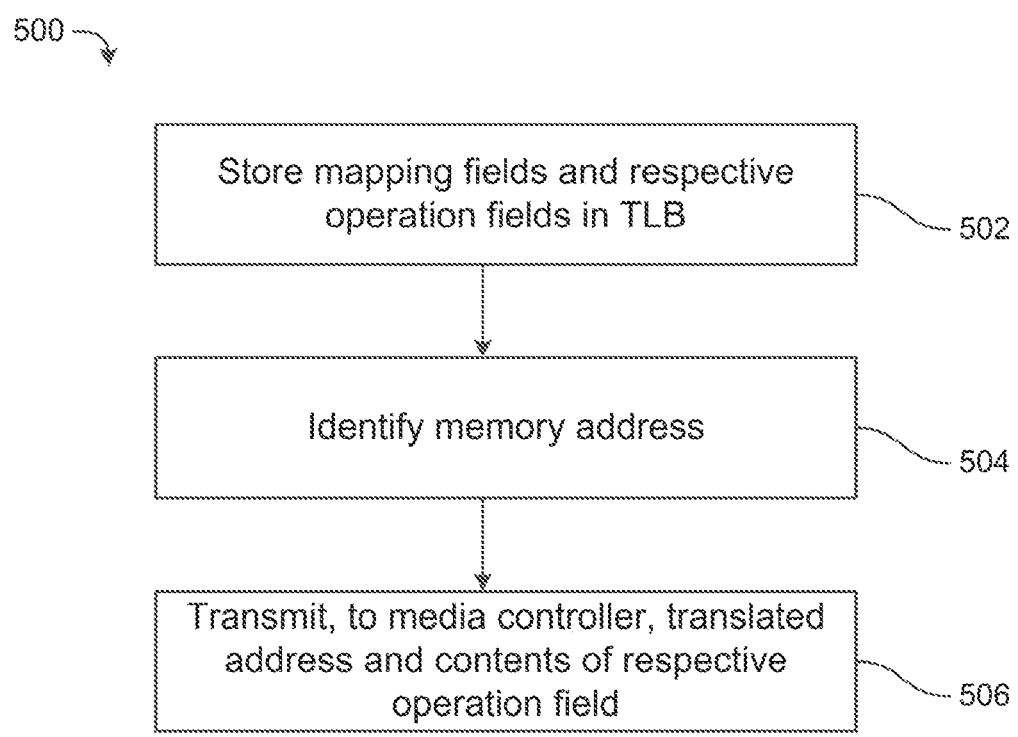
FIG. 5 is a flowchart of an example method for transmitting contents of an operation field to a media controller.

FIG. 5 is a flowchart of an example method 500 for transmitting contents of an operation field to a media controller. Although execution of method 500 is described below with reference to processor 402 of FIG. 4, it should be understood that execution of method 500 may be performed by other suitable devices/entities (e.g., field content transmitter module 114 or 214). Method 500 may be implemented in the form of executable instructions stored on a machine-readable storage medium and/or in the form of electronic circuitry.

Method 500 may start in block 502, where processor 402 may store, in a TLB, of a CPU that is communicatively coupled to a storage volume, mapping fields and respective operation fields. For example, instructions 406 may store mapping fields 108a-b and operation fields 110a-b in TLB 106 of processor 104 in FIG. 1, or mapping fields 208a-b and operation fields 210a-b in TLB 206 of processor 204 in FIG. 2. Operation fields may be populated based on processes corresponding to the respective mapping fields, as discussed above with respect to FIGS. 1 and 3.

In block 504, processor 404 may identify, in response to a storage volume access request generated by one of the processes, and based on contents of one of the mapping fields that matches the storage volume access request, a memory address corresponding to a memory location in the storage volume. For example, a storage volume access request may be a request to read data from a storage volume, or a request to write data to a storage volume. In some implementations, a process may generate a request to write data to a storage volume (e.g., storage volume 102 or 202). The process may specify a virtual address as a destination for the data to be written. Processor 404 may examine mapping fields (e.g., mapping fields 108a-b or 208a-b) in a TLB (e.g., TLB 106 or 206) to find a mapping field that includes the virtual address specified by the process, and identify a physical address, in the mapping field, that maps to the virtual address. The physical address may correspond to a particular memory location in the storage volume. In some implementations, the mapping field may map the virtual address to an intermediate address, as discussed above with respect to FIG. 1.

In block 506, processor 404 may transmit, to a media controller communicatively coupled to the CPU and the storage volume, a translated address based on the identified memory address, and contents of the respective operation field. For example, if the mapping field identified in block 504 includes a virtual address specified by a storage volume access request and a physical address that maps to the virtual address, processor 404 may transmit, to a media controller (e.g., media controller 112 or 212), the physical address as well as the contents of the respective operation field.

In some implementations, contents of the respective operation field may include an encryption key. In such implementations, the media controller may use the encryption key to decrypt data stored at the targeted memory location, and processor 404 may receive the decrypted data from the media controller, as discussed above with respect to FIG. 1. In some implementations, contents of the respective operation field may include an authentication key. In such implementations, the media controller may determine, based on the authentication key, access rights of the process that generated the storage volume access request in response to which processor 404 transmitted the authentication key to the media controller. Access to the targeted memory location may be prevented in response to a determination that the process does not have access rights to the memory location, as discussed above with respect to FIG. 1. In some implementations, contents of the respective operation field may include an accelerator key and/or a transaction identifier. The media controller may perform various operations depending on what is received, as discussed above with respect to FIG. 1.

In some implementations, contents of the respective operation field may include a cache permissions indicator. In such implementations, the media controller may transmit the cache permissions indicator to a cache controller communicatively coupled to the CPU, the media controller, and a cache. The cache controller may determine, based on the cache permissions indicator, whether to store, in the cache, a copy of data stored at the targeted memory location, as discussed above with respect to FIG. 2.

The foregoing disclosure describes storing mapping fields and respective operation fields in a TLB of a CPU, and transmitting contents of operation fields to a media controller that is communicatively coupled to a storage volume. Example implementations described herein enable functionalities in addition to reading and writing data to be performed in or closer to system memory, away from a CPU, and facilitate propagation of access management mechanisms of varying granularity beyond the CPU pipeline.

We claim:

1. A system comprising:
   a storage volume;
   a processor comprising a translation lookaside buffer (TLB);
   a field populator module to populate mapping fields and respective operation fields in the TLB, wherein operation fields are populated based on processes, running on the processor, corresponding to the respective mapping fields;
   a media controller, communicatively coupled to the storage volume and the processor, to control access to and perform functions related to data in the storage volume; and
   a field content transmitter module to, in response to a storage volume access request generated by one of the processes:
      identify, based on contents of one of the mapping fields that matches the storage volume access request, a memory address corresponding to a memory location in the storage volume; and
      transmit, to the media controller, a translated address based on the identified memory address, and contents of the respective operation field.

2. The system of claim 1, wherein:
   contents of the respective operation field comprise an encryption key; and
   the media controller is further to:
      use the encryption key to decrypt data stored at the memory location; and
      transmit the decrypted data to the processor.

3. The system of claim 1, wherein:
   contents of the respective operation field comprise an authentication key; and
   the media controller is further to:
      determine, based on the authentication key, access rights of the one of the processes; and
      prevent, in response to a determination that the one of the processes does not have access rights to the memory location, access by the one of the processes to the memory location.

4. The system of claim 1, wherein:
   contents of the respective operation field comprise an accelerator key; and
   the media controller is further to use the accelerator key to validate a memory-side acceleration function.

5. The system of claim 1, wherein:
   contents of the respective operation field comprise a transaction identifier; and
   the media controller is further to:
      identify, based on the transaction identifier, the one of the processes; and
      determine whether the one of the processes has access rights to the memory location or a function associated with the storage volume access request.

6. The system of claim 1, further comprising a cache communicatively coupled to a cache controller, wherein:
   the cache and the cache controller are communicatively coupled to the processor and the media controller; and
   if contents of the respective operation field comprise a cache permissions indicator:
      the media controller is to transmit the cache permissions indicator to the cache controller; and
      the cache controller is to determine, based on the cache permissions indicator, whether to store, in the cache, a copy of data stored at the memory location.

7. A non-transitory machine-readable storage medium encoded with instructions executable by a processor, the machine-readable storage medium comprising:
   instructions to determine access rights, for accessing a storage volume and functions related to data in the storage volume, of a process running on a central processing unit (CPU); and
   instructions to populate a mapping field and a respective operation field in a translation lookaside buffer (TLB) of the CPU, wherein:
      the respective operation field is populated based on the determined access rights of the process; and
      contents of the respective operation field are transmitted, in response to a storage volume access request generated by the process and directed at a memory location that is in the storage volume and that corresponds to contents of the mapping field, to a media controller associated with the storage volume.

8. The non-transitory machine-readable storage medium of claim 7, wherein contents of the respective operation field comprise at least one of an encryption key and an accelerator key.

9. The non-transitory machine-readable storage medium of claim 7, wherein contents of the respective operation field comprise at least one of an authentication key and a transaction identifier.

10. The non-transitory machine-readable storage medium of claim 7, wherein contents of the respective operation field comprise a cache permissions indicator.

11. A method comprising:
   storing, in a translation lookaside buffer (TLB) of a central processing unit (CPU) that is communicatively coupled to a storage volume, mapping fields and respective operation fields, wherein operation fields are populated based on processes corresponding to the respective mapping fields;
   identifying, in response to a storage volume access request generated by one of the processes, and based on contents of one of the mapping fields that matches the storage volume access request, a memory address corresponding to a memory location in the storage volume; and
   transmitting, to a media controller communicatively coupled to the CPU and the storage volume, a translated address based on the identified memory address, and contents of the respective operation field.

12. The method of claim 11, wherein contents of the respective operation field comprise an encryption key, wherein the media controller is to use the encryption key to decrypt data stored at the memory location, and the method further comprising receiving the decrypted data from the media controller.

13. The method of claim 11, wherein:
   contents of the respective operation field comprise an authentication key;
   the media controller is to determine, based on the authentication key, access rights of the one of the processes; and
   access to the memory location is prevented in response to a determination that the one of the processes does not have access rights to the memory location.

14. The method of claim 11, wherein contents of the respective operation field comprise at least one of an accelerator key and a transaction identifier.

15. The method of claim 11, wherein:
   the media controller is to transmit, if contents of the respective operation field comprise a cache permissions indicator, the cache permissions indicator to a cache controller communicatively coupled to the CPU, the media controller, and a cache; and
   the cache controller is to determine, based on the cache permissions indicator, whether to store, in the cache, a copy of data stored at the memory location.

* * * * *